US011770032B2

(12) United States Patent
Naka et al.

(10) Patent No.: US 11,770,032 B2
(45) Date of Patent: Sep. 26, 2023

(54) STATOR CORE INSULATING MEMBER WITH NON-CONTACT PORTIONS

(71) Applicant: DAIKIN INDUSTRIES, LTD., Osaka (JP)

(72) Inventors: Shoujirou Naka, Osaka (JP); Rei Kondou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 102 days.

(21) Appl. No.: 17/033,024

(22) Filed: Sep. 25, 2020

(65) Prior Publication Data
US 2021/0013751 A1 Jan. 14, 2021

Related U.S. Application Data

(63) Continuation of application No. PCT/JP2019/011167, filed on Mar. 18, 2019.

(30) Foreign Application Priority Data

Mar. 28, 2018 (JP) .................................. 2018-062268

(51) Int. Cl.
*H02K 1/14* (2006.01)
*F25B 1/00* (2006.01)
*H02K 3/32* (2006.01)

(52) U.S. Cl.
CPC .............. *H02K 1/146* (2013.01); *F25B 1/00* (2013.01); *H02K 3/325* (2013.01)

(58) Field of Classification Search
CPC .......... H02K 1/146; H02K 1/165; H02K 1/16; H02K 3/325; H02K 3/345; F25B 1/00
(Continued)

(56) References Cited

U.S. PATENT DOCUMENTS 6,191,508 B1 2/2001 Aoki et al.
2012/0080976 A1* 4/2012 Oka ...................... H02K 3/522
310/215
(Continued)

FOREIGN PATENT DOCUMENTS

EP 3 477 823 A1 5/2019
JP 51-90402 A 8/1976
(Continued)

OTHER PUBLICATIONS

Machine translation of JP-2018042400-A. (Year: 2018).*
(Continued)

*Primary Examiner* — Michael Andrews
(74) *Attorney, Agent, or Firm* — Global IP Counselors, LLP

(57) ABSTRACT

A stator core of an electric motor includes a core body, a slot, and an insulating member. The insulating member is integrated with the core body and has a linear expansion coefficient different from the core body. The insulating member includes, at a peripheral wall portion, a plurality of contact portions extending throughout a cylinder axial direction of the stator core and being in contact with the peripheral wall portion, and a noncontact portion positioned between adjacent ones of the contact portions. The noncontact portion extends throughout the cylinder axial direction and is not in contact with the peripheral wall portion. The peripheral wall portion has an inner peripheral wall portion forming a peripheral wall of the slot, and an outer peripheral wall portion forming an outer peripheral wall of the core body. The insulating member is located at at least one of the inner and outer peripheral wall portions.

5 Claims, 15 Drawing Sheets

(58) Field of Classification Search
USPC .................................................. 310/216.105
See application file for complete search history.

(56) References Cited

U.S. PATENT DOCUMENTS

| | | | |
|---|---|---|---|
| 2013/0113332 A1 | 5/2013 | Saito | |
| 2018/0367006 A1 | 12/2018 | Fujiwara et al. | |
| 2019/0131828 A1* | 5/2019 | Oketani | .................. H02K 5/15 |

FOREIGN PATENT DOCUMENTS

| | | | | |
|---|---|---|---|---|
| JP | 62-2344 | U | 1/1987 | |
| JP | 2002-84698 | A | 3/2002 | |
| JP | 2012-223030 | A | 11/2012 | |
| JP | 2017-200267 | A | 11/2017 | |
| JP | 2017-220979 | A | 12/2017 | |
| JP | 2017-229169 | A | 12/2017 | |
| JP | 2017220979 | A * | 12/2017 | |
| JP | 2018042400 | A * | 3/2018 | ............. F04B 35/04 |
| WO | 2012/011168 | A1 | 1/2012 | |
| WO | 2017/090513 | A1 | 6/2017 | |
| WO | 2017/221951 | A1 | 12/2017 | |
| WO | 2018/011950 | A1 | 1/2018 | |
| WO | 2018/047462 | A1 | 3/2018 | |

OTHER PUBLICATIONS

Machine translation of JP-2017220979-A. (Year: 2017).*
European Search Report of corresponding EP Application No. 19 77 7136.3 dated Oct. 8, 2021.
International Preliminary Report of corresponding PCT Application No. PCT/JP2019/011167 dated Oct. 8, 2020.
International Search Report of corresponding PCT Application No. PCT/JP2019/011167 dated Jun. 4, 2019.

* cited by examiner

STATOR CORE INSULATING MEMBER WITH NON-CONTACT PORTIONS

CROSS-REFERENCE TO RELATED APPLICATIONS

This is a continuation of International Application No. PCT/JP2019/011167 filed on Mar. 18, 2019, which claims priority to Japanese Patent Application No. 2018-062268 filed on Mar. 28, 2018. The entire disclosures of these applications are incorporated by reference herein.

BACKGROUND

Field of Invention

The present disclosure relates to a stator core and a compressor.

Background Information

A conventional stator core of a motor, as disclosed in, for example, Japanese Unexamined Patent Publication No. 2002-084698, includes a core body made of a plurality of laminated steel sheets, and an insulating member including resin material provided so as to cover the core body.

SUMMARY

A first aspect of the present disclosure is directed to a stator core (70) in an electric motor (15), the stator core (70) including: a core body (40) having a back yoke (41) in a cylindrical shape, and a plurality of teeth (42) extending from the back yoke (41) radially inward; a slot (45) located between adjacent ones of the teeth (42); and an insulating member (60) integrated with the core body (40), the insulating member (60) having a linear expansion coefficient different from a linear expansion coefficient of the core body (40), wherein the insulating member (60) includes, at a peripheral wall portion (48) forming a peripheral wall of the core body (40), a plurality of contact portions (61) extending throughout a cylinder axial direction of the stator core (70) and being in contact with the peripheral wall portion (48), and a noncontact portion (62, 65, 67) positioned between adjacent ones of the contact portions (61), the noncontact portion (62, 65, 67) extending throughout the cylinder axial direction and not being in contact with the peripheral wall portion (48), the peripheral wall portion (48) has an inner peripheral wall portion (48a) forming a peripheral wall of the slot (45), and an outer peripheral wall portion (48b) forming an outer peripheral wall of the core body (40), and the insulating member (60) is located at at least one of the inner peripheral wall portion (48a) or the outer peripheral wall portion (48b).

DETAILED DESCRIPTION OF EMBODIMENT(S)

First Embodiment

Figure 1:
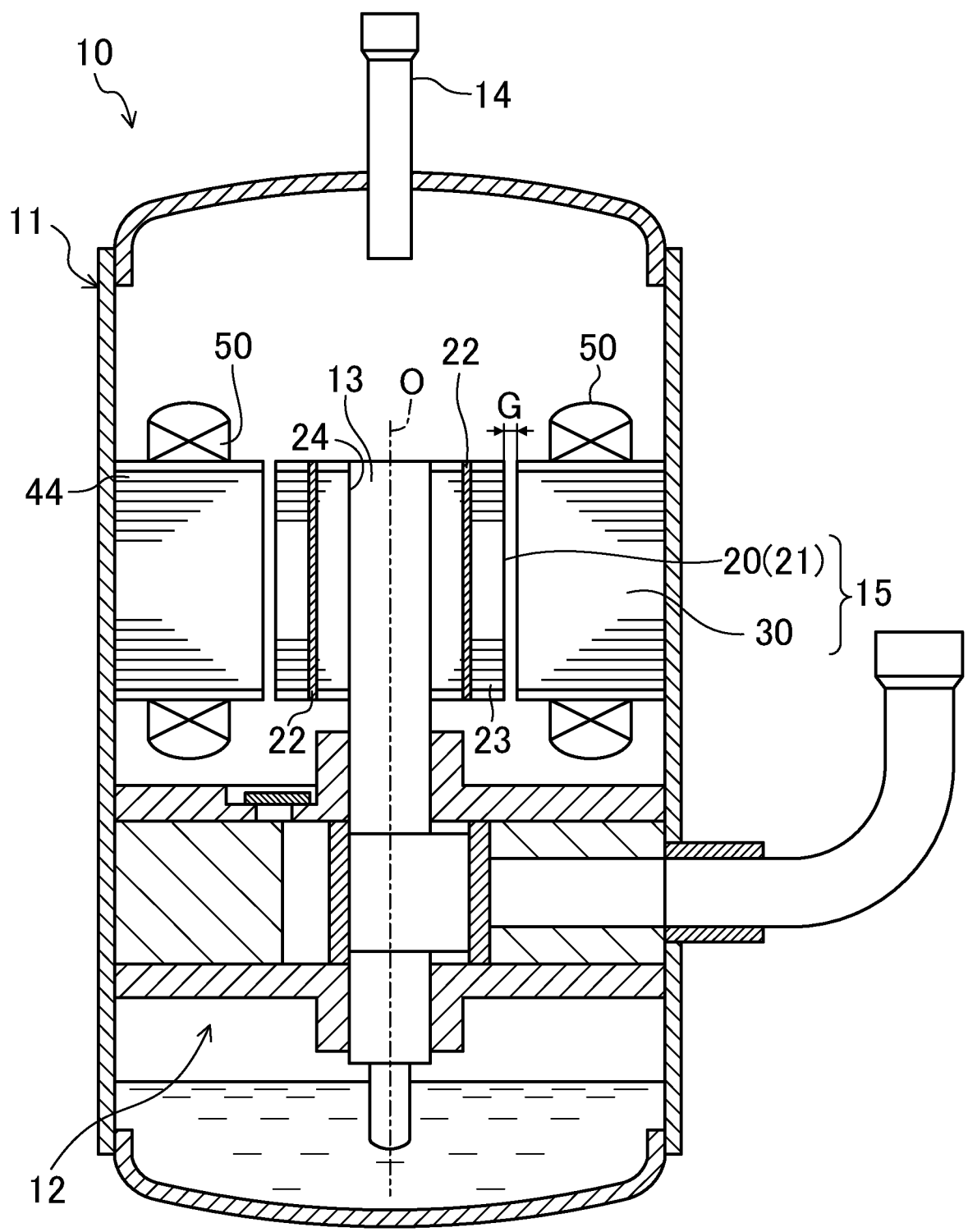
FIG. 1 is a cross-sectional view of a compressor of a first embodiment.

An example of a stator core of an electric motor for a compressor will be described as a first embodiment of the present disclosure. FIG. 1 is a cross-sectional view of a compressor (10) of the first embodiment of the present disclosure. As shown in FIG. 1, the compressor (10) has a casing (11), in which a compression mechanism (12) and an electric motor (15) are housed. The electric motor (15) of the present embodiment is a magnet-embedded type electric motor. The configuration of the electric motor (15) will be described later in detail. As a compression mechanism (12), compression mechanisms of various types may be employed, and examples of the compression mechanism include a rotary compression mechanism. The compression mechanism (12) and the electric motor (15) are coupled to each other with a drive shaft (13). The compression mechanism (12) operates when a rotor (20) (described later) of the electric motor (15) rotates.

In the compressor (10), when the compression mechanism (12) operates, a fluid (for example, a refrigerant) compressed by the compression mechanism (12) is discharged into the casing (11). Then, the fluid that has been discharged in the casing (11) is discharged from a discharge pipe (14) provided in the casing (11). In the present embodiment, the operation of the compression mechanism (12) causes a temperature inside the casing (11) to range, for example, from about −30° C. to about 150° C. Consequently, during operation of the compressor (10), a temperature of the electric motor (15) ranges from about −30° C. to about 150° C., as well.

Configuration of Electric Motor

The electric motor (15) includes the rotor (20) and a stator (30). Note that, in the following description, an axial direction (a cylinder axial direction) refers to the direction along a center axis (0) of the drive shaft (13), and a radial direction refers to the direction orthogonal to the axial direction. An outer peripheral side refers to a side farther from the center axis (0), and an inner peripheral side refers to a side closer to the center axis (0). Further, a vertical cross section refers to a cross section parallel to the center axis (0), and a horizontal cross section refers to a cross section orthogonal to the center axis (0).

Rotor

The rotor (20) includes a rotor core (21) and a plurality of permanent magnets (22). Each permanent magnet (22) passes through the rotor core (21) in the axial direction. The permanent magnets (22) are, for example, sintered magnets or so-called bonded magnets.

The rotor core (21) is a so-called laminated core. Specifically, the rotor core (21) is comprised of a plurality of core members (23) formed by punching a magnetic steel sheet of, for example, 0.2 mm to 0.5 mm in thickness, using a pressing machine, and laminated in the axial direction. In this example, the laminated multiple core members (23) are joined by crimping to form the cylindrical rotor core (21). The magnetic steel sheet used as the material of the core members (23) is preferably provided with an insulation coating, in view of reducing the generation of eddy current.

The core member (23) is provided with a through hole (not shown) which serves as a magnet slot (not shown) for accommodating the permanent magnets (22). Further, the rotor core (21) has a shaft hole (24) in the center. The drive shaft (13) for driving a load (the compression mechanism (12) in this example) is tightly fitted (e.g., shrink fitted) in the shaft hole (24). Therefore, the center axis of the rotor core (21) and the center axis (0) of the drive shaft (13) are coaxial with each other. Note that FIG. 1 does not illustrate end plates (e.g., disc-shaped members made of a non-magnetic material such as stainless steel), which are generally disposed at both axial ends of the rotor (20).

Stator

Figure 2:
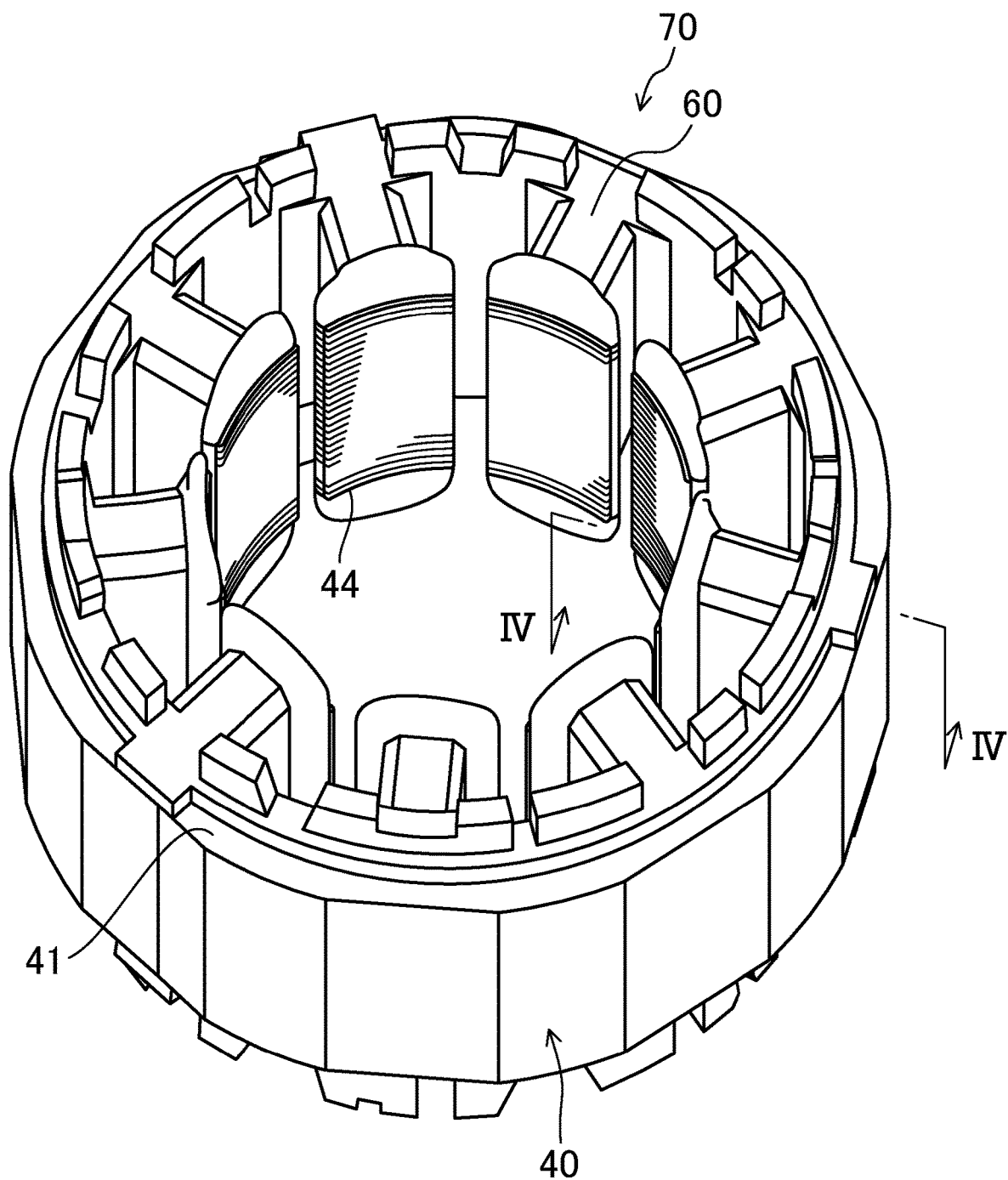
FIG. 2 is a perspective view of a stator core.
Figure 3:
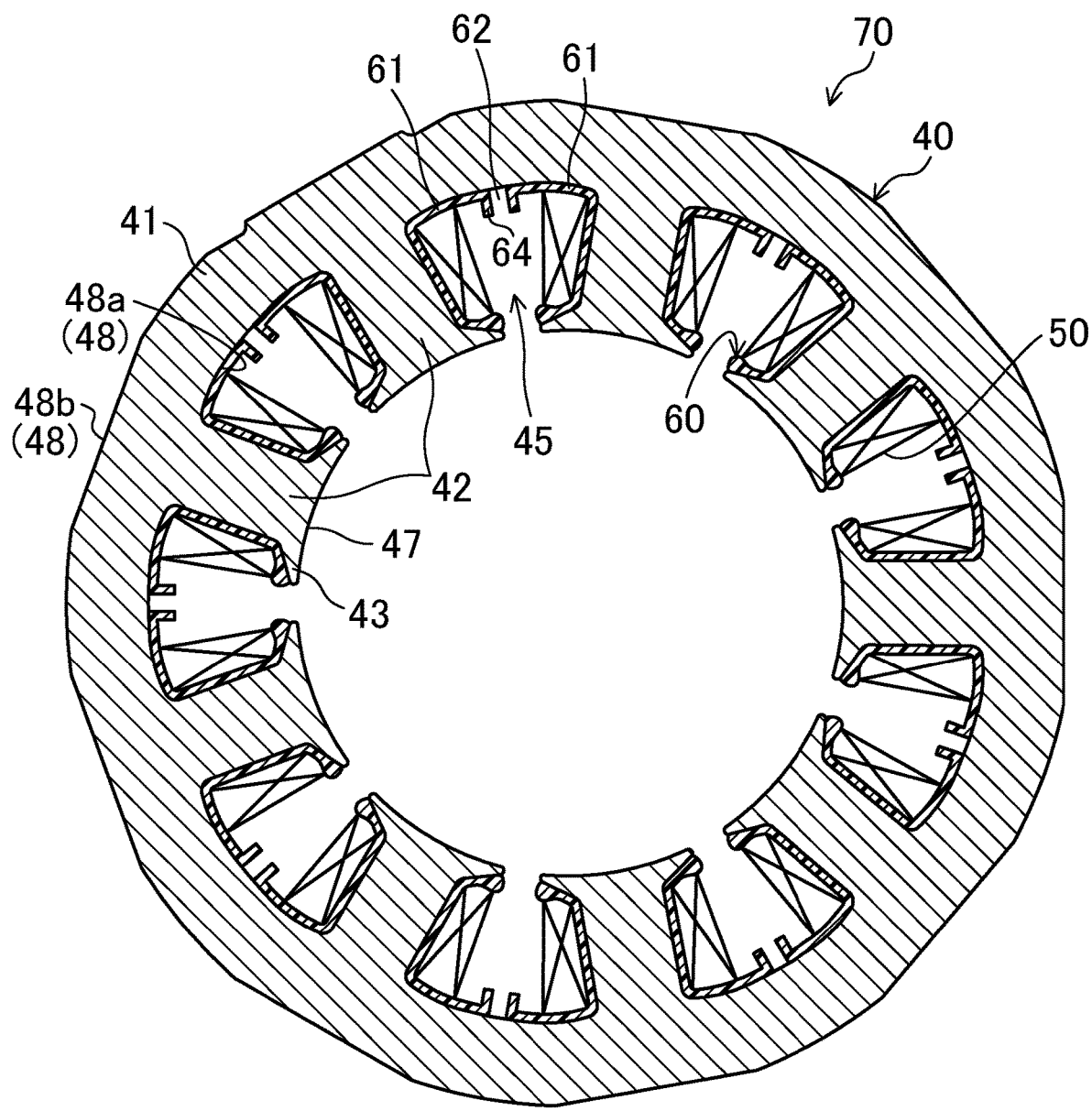
FIG. 3 is a horizontal cross-sectional view of the stator core.
Figure 4:
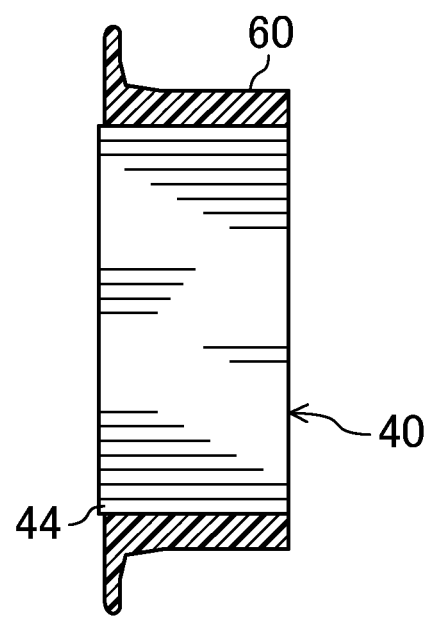
FIG. 4 is a vertical cross-sectional view of a tooth.

The stator (30) includes a core body (40), a winding (50) and an insulating member (60). Here, the core body (40) provided with the insulating member (60) (without the winding (50)) will be referred to as a stator core (70). FIG. 2 is a perspective view of the stator core (70). FIG. 3 is a horizontal cross-sectional view of the stator core (70). The core body (40) is a cylindrical, so-called laminated core. Specifically, the core body (40) is comprised of a plurality of core members (44) formed by punching a magnetic steel sheet of, for example, 0.2 mm to 0.5 mm in thickness, using a pressing machine, and laminated in the axial direction. The laminated core members (44) are joined together by, for example, crimping. The magnetic steel sheet used as the material of the core members (44) is preferably provided with an insulation coating, in view of reducing the generation of eddy current.

As shown in FIG. 3, the core body (40) includes one back yoke (41) and a plurality of (in this embodiment, nine) teeth (42). The core body (40) is a so-called integrated core formed integrally and not divided in a horizontal cross-sectional view.

The back yoke (41) is an annular portion of the outer peripheral side of the core body (40) when viewed in a horizontal cross section. The core body (40) is fixed in the casing (11) by fitting the outer peripheral surface of the back yoke (41) so as to come into contact with the inner peripheral surface of the casing (11). The outer peripheral surface of the back yoke (41) serves as an outer peripheral wall portion (48b) forming the outer peripheral wall of the core body (40). The outer peripheral wall portion (48b) is a part of a peripheral wall portion (48) forming the peripheral wall of the core body (40).

Each tooth (42) is a rectangular parallelepiped portion extending in the radial direction in the core body (40). Specifically, each tooth (42) extends toward the inner peripheral side. In other words, each tooth (42) extends radially inward. The winding (50) is wound on each tooth (42) via the insulating member (60) by, for example, concentrated winding. A space between adjacent teeth (42) serves as a slot (45) for a coil for accommodating the winding (50) to be wound around. As described above, the inner peripheral surface of the back yoke (41) and the radially extending portions of the outer surfaces of the teeth (42) constitute an inner peripheral wall portion (48a) that forms a peripheral wall of the slot (45). The inner peripheral wall portion (48a) is a part of the peripheral wall portion (48) that forms the peripheral wall of the core body (40). Note that the winding (50) may be, for example, a coated conducting wire. As described above, an electromagnet is formed at each tooth (42).

A distal end portion of each tooth (42) is provided with a flange (43). Each flange (43) is a portion continuous with the distal end portion of each tooth (42) and projecting from the distal end portion of each tooth (42) in a circumferential direction of the back yoke (41). The tooth (42) including the flange (43) has a distal end surface (47) which is curved and faces an outer peripheral surface (cylinder surface) of the rotor (20) with a predetermined distance (air gap (G)) from the outer peripheral surface.

Insulating Member

The insulating member (60) is integrated with the core body (40) and covers the core body (40). In this way, the insulating member (60) electrically insulates the winding (50) and the core body (40) from each other. The insulating member (60) of the present embodiment is formed so as to enclose the core member (44) from both axial ends of the stator core (70) in a stacking direction of the core member (44) (magnetic steel sheets) during operation of the compressor (10).

Figure 5:
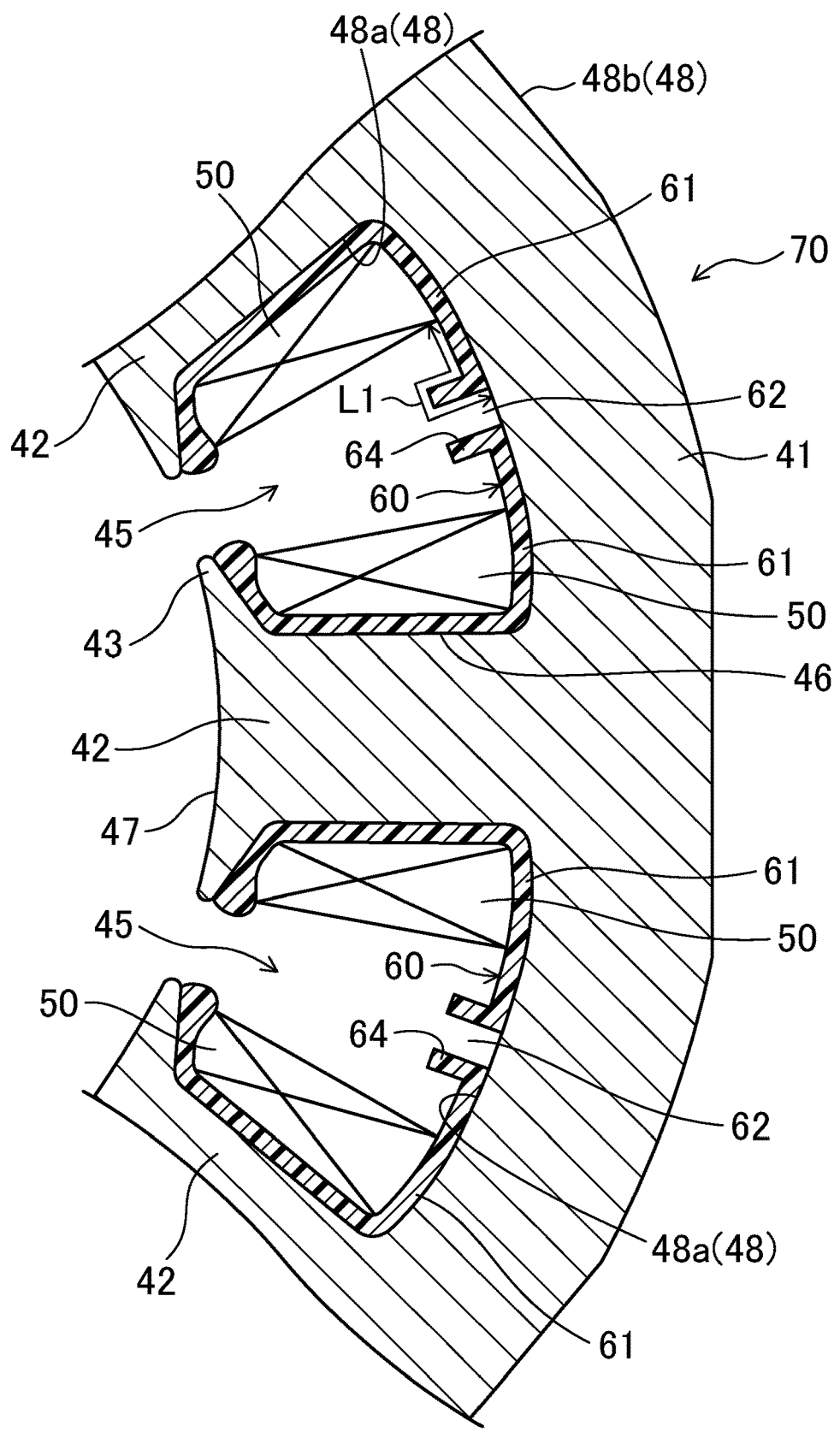
FIG. 5 is an enlarged view of a vicinity of the tooth in a horizontal cross section of the stator core.

Specifically, the insulating member (60) covers both end surfaces, in the axial direction, and the inner peripheral surface of the back yoke (41). The insulating member (60) covers both end surfaces, in the axial direction, of the tooth (42) and a portion of the tooth (42) constituting the inner peripheral wall portion (48a) of the slot (45). Note that the distal end surface (47) of the tooth (42) is not covered with the insulating member (60). Further, as shown in FIG. 5, in the insulating member (60), the portion corresponding to the flange (43) of the tooth (42) is formed to be thicker than the portion corresponding to the base end portion (46) of the tooth (42) in a cross section orthogonal to the stacking direction.

The insulating member (60) includes a contact portion (61) that is in contact with the inner peripheral wall portion (48a), and a noncontact portion (62) that is not in contact with the inner peripheral wall portion (48a). Specifically, in each slot (45), the insulating member (60) is divided, by a clearance (62), into two contact portions (61) in a circumferential direction of the slot (45).

The contact portion (61) is integrated with the inner peripheral wall portion (48a) throughout the axial direction of the inner peripheral wall portion (48a). The contact portion (61) is divided in a circumferential middle portion of the inner peripheral surface of the back yoke (41) (a part of the inner peripheral wall portion (48a)) in each slot (45).

In the present embodiment, the noncontact portion (62) is the clearance (62). Therefore, the noncontact portion (62) is positioned between the contact portions (61) that are adjacent to each other in the circumferential direction of the slot (45), and extends throughout the axial direction of the inner peripheral wall portion (48a).

Further, the contact portion (61) includes a projected portion (64) protruding toward the inner side of the slot (45), at an edge of the clearance (62). In other words, in each slot (45), the noncontact portion (62) is formed between the projected portions (64) that are adjacent to each other. More specifically, the projected portion (64) protrudes toward the center of the slot (45) in a horizontal cross-sectional view.

Note that, in the present embodiment, the clearance (62) is formed in the insulating member (60). Therefore, the creepage distance between the winding (50) and the core body (40) is a creepage distance (L1) between the winding (50) and the portion of the back yoke (41) corresponding to the clearance (62), along the contact portion (61). The creepage distance (L1) is preferably, for example, 2.4 mm or more so as to comply with the UL Standards (UL 1995).

The insulating member (60) having the above structure is formed through molding of resin material (described later) that is to serve as the insulating member (60), integrally with the core body (40) by so-called insert molding.

In the case of the electric motor (15) incorporated in the compressor (10), the resin material for the insulating member (60) is selected in consideration of a temperature of the electric motor (15) during operation of the compressor (10). For example, resin material having a linear expansion coefficient larger than that of the material of the core body (40) (magnetic steel sheet) in the stacking direction and the circumferential direction of the slot (45) may be selected as the resin material for the insulating member (60). Note that the resin material for the insulating member (60) should be selected in consideration of a strength in case a temperature of the resin becomes lower than the temperature of the compressor (10) during operation.

In the present embodiment, examples of the resin material for the insulating member (60) include polybutylene terephthalate (PBT) containing glass fibers. The content of the glass fibers may be determined depending on the required strength of the insulating member (60). In this embodiment, the exemplary content of the glass fibers is 30%. In a case in which glass fibers are contained in the resin material, the resin material may be injected, in insert molding, such that the glass fibers align in the stacking direction. Specifically, the resin material may be injected from an end surface side in the axial direction of the core body (40).

Advantages of First Embodiment

The stator core (70) of the present embodiment includes: a core body (40) having a back yoke (41) in a cylindrical shape, and a plurality of teeth (42) extending from the back yoke (41) radially inward; a slot (45) located between adjacent ones of the teeth (42); and an insulating member (60) integrated with the core body (40), the insulating member (60) having a linear expansion coefficient different from a linear expansion coefficient of the core body (40), wherein the insulating member (60) includes, at a peripheral wall portion (48) forming a peripheral wall of the core body (40), a plurality of contact portions (61) extending throughout a cylinder axial direction of the stator core (70) and being in contact with the peripheral wall portion (48), and a noncontact portion (62) positioned between adjacent ones of the contact portions (61), the noncontact portion (62) extending throughout the cylinder axial direction and not being in contact with the peripheral wall portion (48), the peripheral wall portion (48) has an inner peripheral wall portion (48a) forming a peripheral wall of the slot (45), and an outer peripheral wall portion (48b) forming an outer peripheral wall of the core body (40), and the insulating member (60) is located on the inner peripheral wall portion (48a).

In the present embodiment, the noncontact portion (62) is a portion that does not deform along with a deformation of the core body (40). Thus, thermal stress that is generated in the insulating member (60) may be reduced. Breakage of the insulating member (60) may therefore be reduced without reinforcing the insulating member (60) by making it thicker. In this way, a decrease in a space factor of the winding (50) due to a reduction in the effective area of the slot (45) is reduced, and breakage of the insulating member (60) may be reduced.

Further, in the stator core (70) of the present embodiment, the insulating member (60) is divided, at the peripheral wall portion (48), by the clearance (62), and the clearance (62) is the noncontact portion (62).

In the present embodiment, the length of the insulating member (60) extending continuously in the circumferential direction of the slot (45) is shortened. Thus, thermal stress that is generated in the insulating member (60) may be further reduced. Further, the noncontact portion (62) may be easily formed.

Further, in the stator core (70) of the present embodiment, the contact portion (61) includes, at the edge of the clearance (62) on the inner peripheral wall portion (48a), the projected portion (64) protruding toward the inner side of the slot (45).

In the present embodiment, the creepage distance from the winding (50) to the portion of the peripheral wall portion (48) corresponding to the clearance (62) may be increased. Thus, the clearance (62) may be provided while an insulation distance between the winding (50) and the core body (40) is secured.

Variations of First Embodiment

In the above-described embodiment, the projected portions (64) of the contact portions (61) protrude toward the center of the slot (45) in a horizontal cross-sectional view. However, the direction in which the projected portion (64) protrudes is not limited. The angle of protrusion of the projected portion (64) may be any angle at which, for example, a nozzle used for winding the winding (50) is easily inserted into the slot (45).

Second Embodiment

A second embodiment will be described. In a stator core (70) according to the present embodiment, an insulating member (60) and a back yoke (41) have different shapes than those in the stator core (70) of the first embodiment. The stator core (70) of the present embodiment will be now described, including differences from the stator core (70) of the first embodiment.

Figure 6:
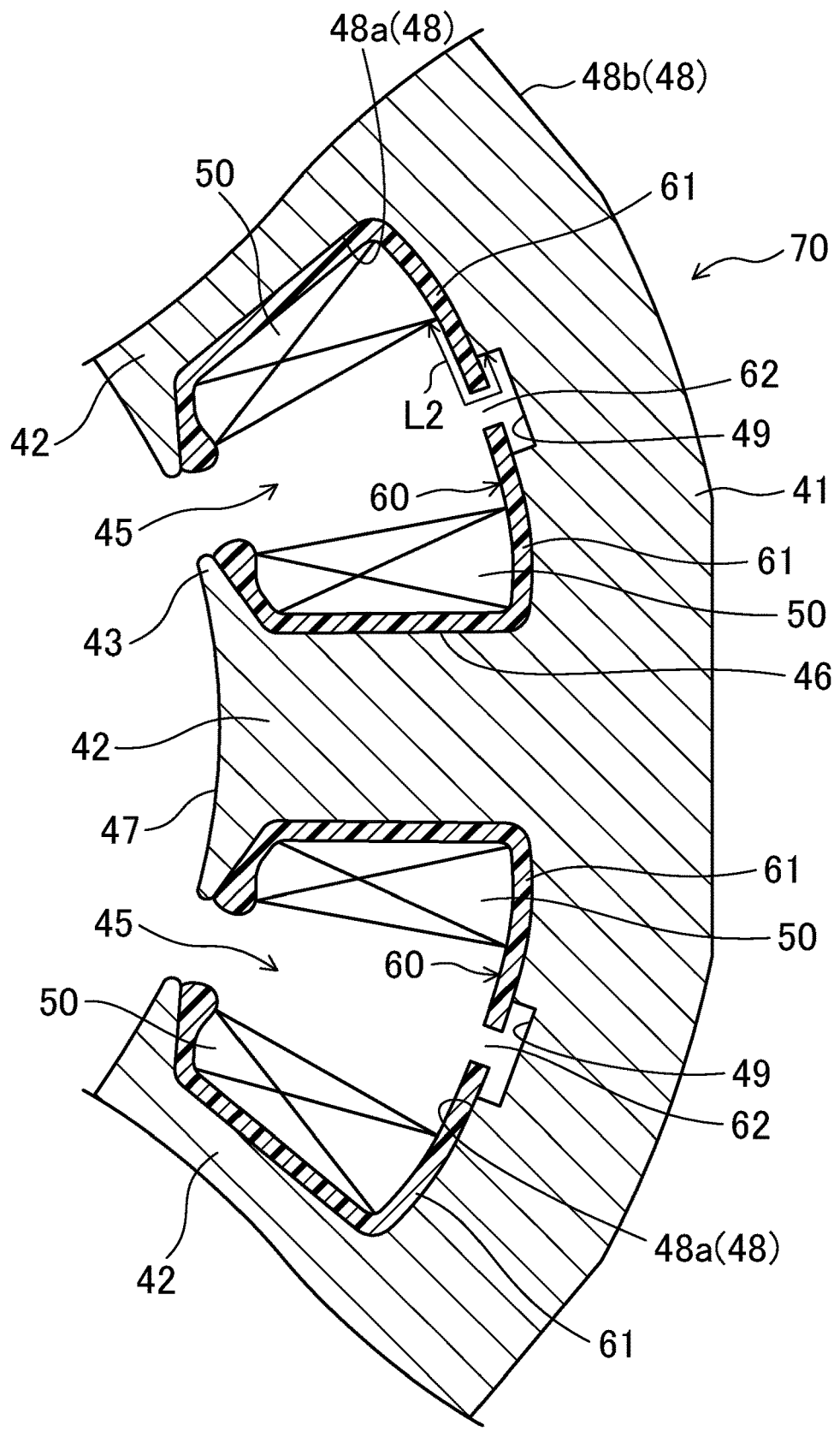
FIG. 6 corresponds to FIG. 5 and illustrates a second embodiment.
Figure 7:
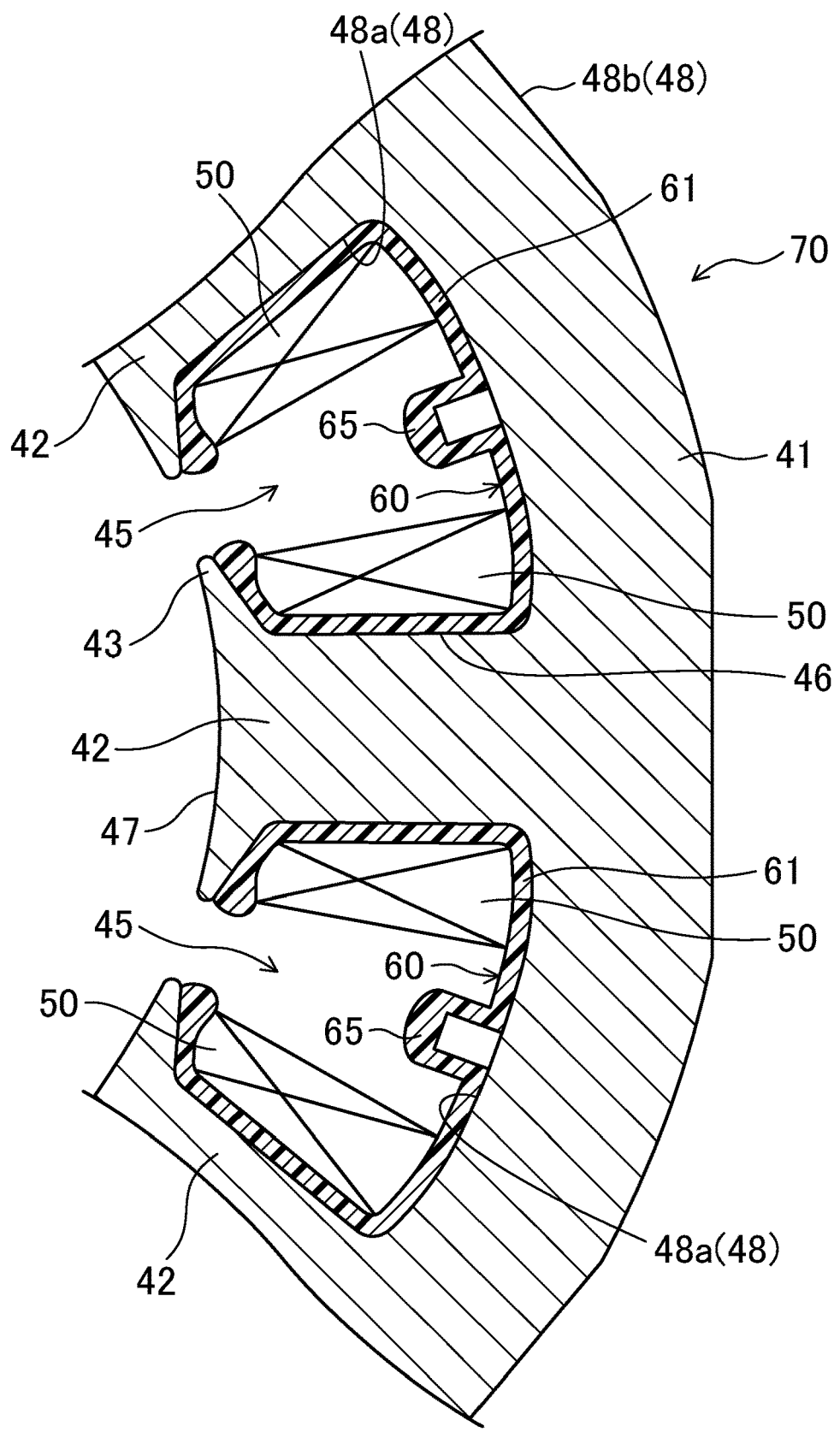
FIG. 7 corresponds to FIG. 5 and illustrates a third embodiment.
Figure 8:
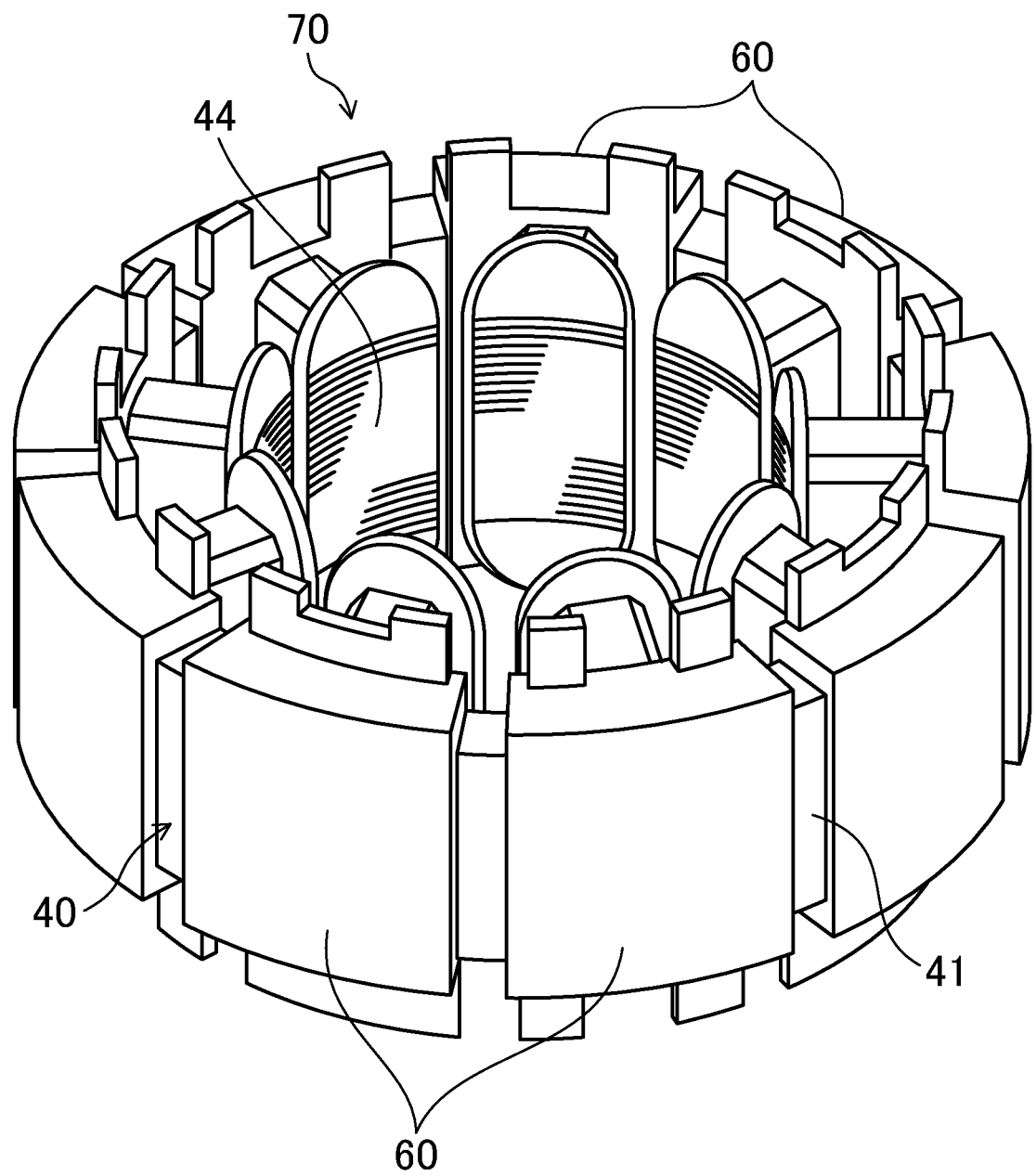
FIG. 8 is a perspective view of a stator core of a fourth embodiment.
Figure 9:
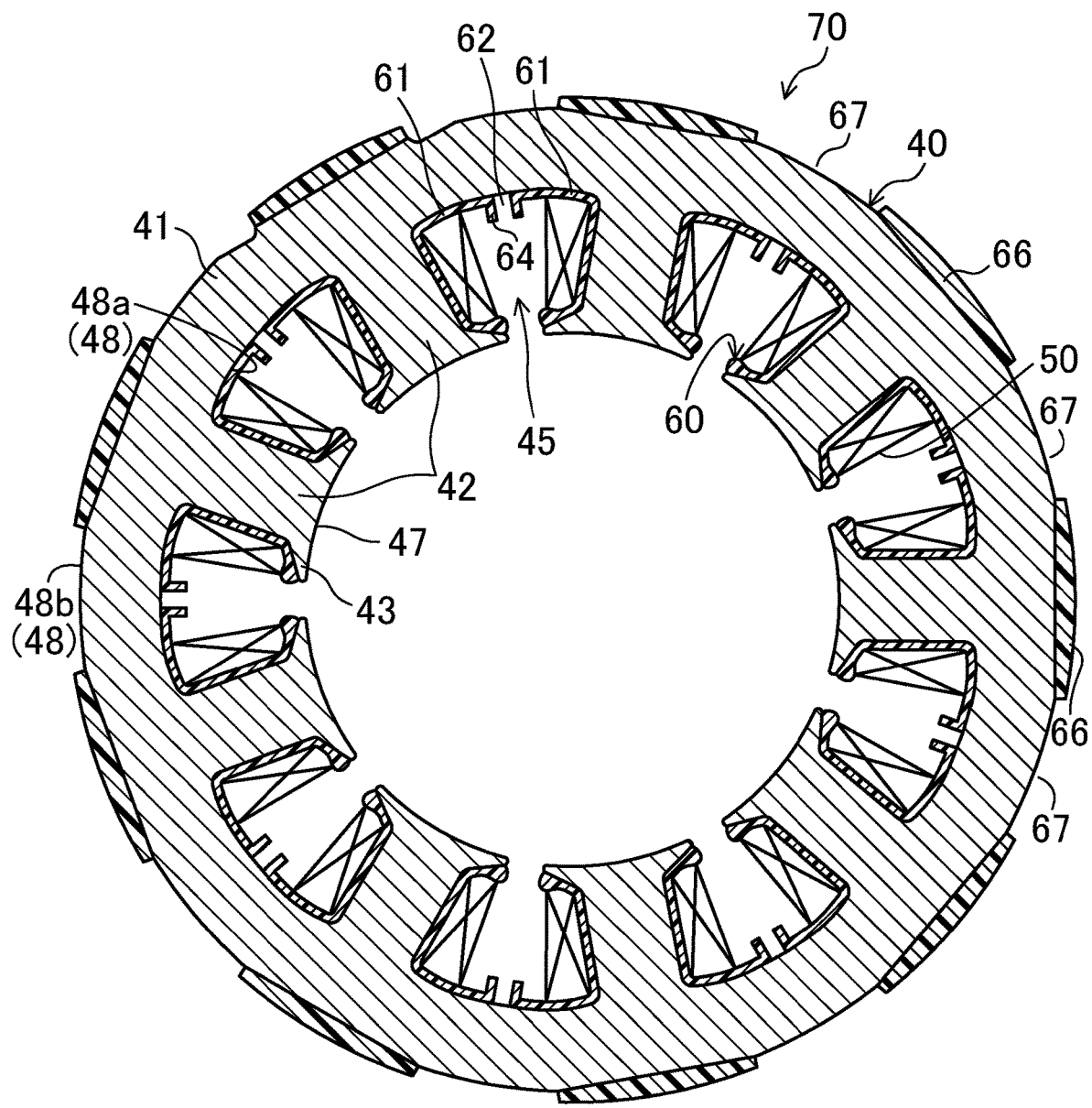
FIG. 9 is a horizontal cross-sectional view of the stator core.
Figure 10:
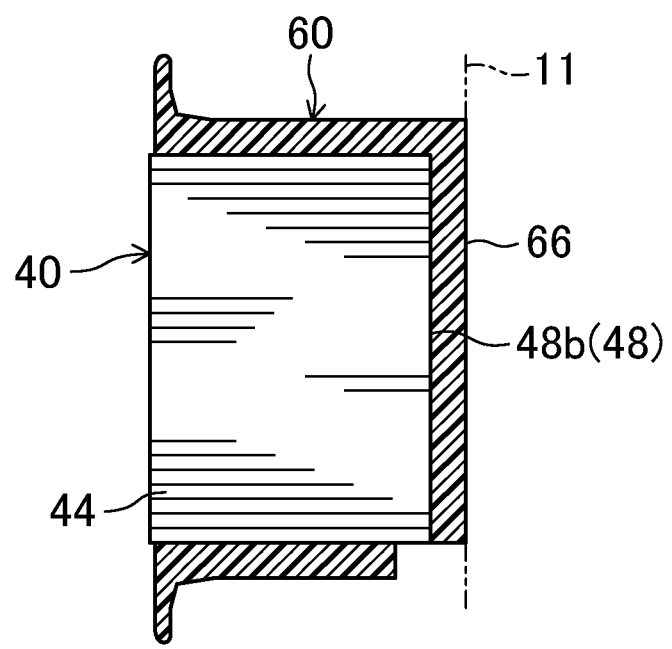
FIG. 10 is a vertical cross-sectional view of a part of the stator core.

As shown in FIG. 6, the insulating member (60) of the present embodiment has no projected portion (64).

The inner peripheral wall portion (48a) includes a recess (49) recessed toward the outside of the slot (45). The recess (49) is formed, in the inner peripheral wall portion (48a), in an area including a portion corresponding to the clearance (62) and portions adjacent to the portion corresponding to the clearance (62) in the circumferential direction of the slot (45). Specifically, the recess (49) is formed in the back yoke (41).

In the present embodiment, a creepage distance between the winding (50) and the core body (40) is a creepage distance (L2) between the winding (50) and the recess (49), along the contact portion (61). Therefore, in comparison with the case in which the recess (49) is not formed, the creepage distance (L2) is longer in the circumferential direction of the inner peripheral wall portion (48a) by a length of a surface of the contact portion (61) facing the recess (49).

Advantages of Second Embodiment

In the present embodiment, the creepage distance from the winding (50) to the portion of the inner peripheral wall portion (48a) corresponding to the clearance (62) may be increased. Thus, the clearance (62) may be provided while an insulation distance between the winding (50) and the core body (40) is secured.

Variations of Second Embodiment

Although the stator core (70) having the insulating member (60) without the projected portion (64) has been described in the above embodiment, the projected portion (64) may be formed on the contact portion (61). Forming the projected portion (64) on the contact portion (61) and forming the recess (49) in the inner peripheral wall portion (48a) may further increase the insulation distance between the winding (50) and the core body (40).

Third Embodiment

The third embodiment will be described. A stator core (70) of the present embodiment is a modified version, of the stator core (70) of the first embodiment, in which the configuration of the insulating member (60) has been changed. The stator core (70) of the present embodiment will be now described, including differences from the stator core (70) of the first embodiment.

The insulating member (60) of the present embodiment is not divided inside the slot (45). Further, the noncontact portion (65) of the present embodiment is a separation portion (65) that is separated from the inner peripheral wall portion (48a) and covers the inner peripheral wall portion (48a).

The separation portion (65) is integrated with the contact portion (61). The separation portion (65) is positioned between the contact portions (61) adjacent to each other in the circumferential direction of the slot (45), and extends throughout the axial direction of the inner peripheral wall portion (48a). The separation portion (65) is positioned inside the slot (45) more inward than the contact portion (61), and covers the inner peripheral wall portion (48a). The separation portion (65) has a thickness greater than or equal to the thickness of the other portion of the insulating member (60).

In a preferred embodiment, the insulating member (60) of the present embodiment is made of elastically deformable material, for example, resin material.

Advantages of Third Embodiment

In the present embodiment, the separation portion (65) is elastically deformed, thus making it possible to reduce thermal stress that is generated in the insulating member (60).

Fourth Embodiment

The fourth embodiment will be described. A stator core (70) of the present embodiment is a modified version, of the stator core (70) of the first embodiment, in which the configuration of the insulating member (60) has been changed. The stator core (70) of the present embodiment will be now described, including differences from the stator core (70) of the first embodiment.

As shown in FIGS. 8 to 11, the insulating member (60) of the present embodiment is formed not only at the inner peripheral wall portion (48a), but also at an outer peripheral wall portion (48b). A portion of the insulating member (60) formed at the outer peripheral wall portion (48b) electrically insulates the casing (11) of the compressor (10) and the core body (40) from each other. Accordingly, electromagnetic noise generating in the compressor (10) is reduced. Note that, in FIGS. 10 and 11, the inner peripheral wall of the casing (11) is indicated by a dash-dot-dot line.

Specifically, the insulating member (60) covers surfaces of the back yoke (41), the surfaces including: one end surface (in this example, an upper end surface) in the axial direction; the other end surface in the axial direction (in this example, the lower end surface); the inner peripheral surface; and the outer peripheral wall portion (48b) serving as the outer peripheral surface. On the other hand, a part on the outer peripheral side of the other end surface in the axial direction of the back yoke (41) is not covered by the insulating member (60).

The insulating member (60) includes a contact portion (66) that is in contact with the outer peripheral wall portion (48b), and a noncontact portion (67) that is not in contact with the outer peripheral wall portion (48b). Specifically, in the outer peripheral wall portion (48b) of the core body (40), the insulating member (60) is divided into a plurality (in this example, nine) of contact portions (66) with a clearance (67) in the circumferential direction of the outer peripheral wall portion (48b).

Figure 11:
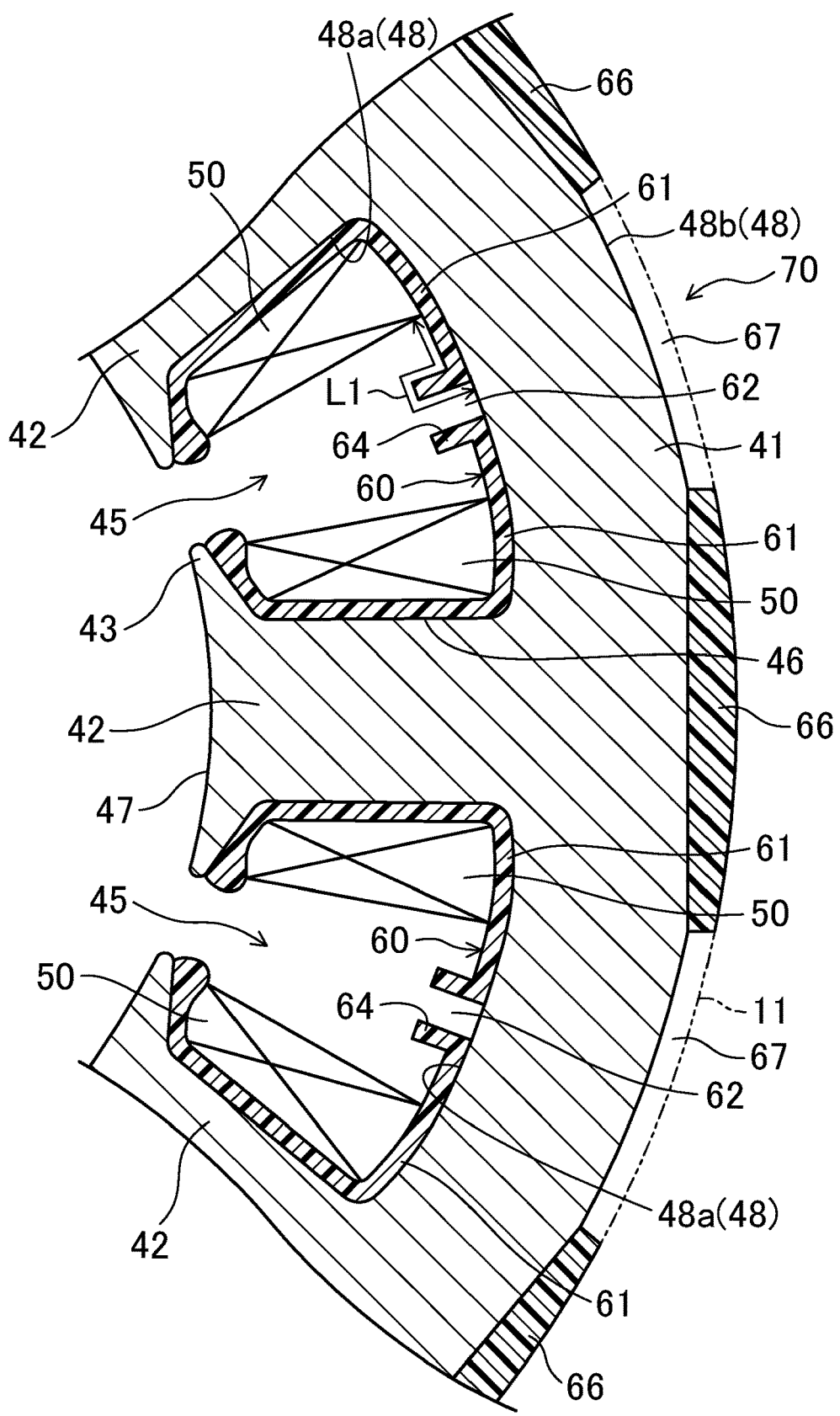
FIG. 11 is an enlarged view of a vicinity of a tooth in a horizontal cross section of the stator core.

The contact portion (66) is integrated with the outer peripheral wall portion (48b) throughout the axial direction of the outer peripheral wall portion (48b). The contact portions (66) are spaced apart from each other at the outer peripheral wall portion (48b) at substantially the same circumferential positions as the circumferential positions at which the contact portions (61) are spaced apart from each other at the inner peripheral wall portion (48a). The contact portion (66) provided at the outer peripheral wall portion (48b) is disposed on the outer peripheral side of each tooth (42). Note that a circumferential length of the contact portion (66) shown in FIG. 11 is merely an example, and may be longer or shorter than the length shown.

Each of the plurality of contact portions (66) provided at the outer peripheral wall portion (48b) is continuous with an associated one of the contact portions (61) provided at the inner peripheral wall portion (48a) on one end side (in this example, an upper end side) in the cylinder axial direction of the stator core (70). On the other hand, each of the plurality of contact portions (66) provided at the outer peripheral wall portion (48b) is not continuous with an associated one of the contact portions (61) provided at the inner peripheral wall portion (48a) on the other end side (in this example, a lower end side) in the cylinder axial direction of the stator core (70). Note that each of the contact portions (66) provided at the outer peripheral wall portion (48b) and an associated one of the contact portions (61) provided at the inner peripheral wall portion (48a) may be continuous with each other at the one end side and the other end side in the cylinder axial direction of the stator core (70).

In the present embodiment, the noncontact portion (67) is the clearance (67). Therefore, the noncontact portion (67) is positioned between the contact portions (66) adjacent to each other in the circumferential direction of the outer peripheral wall portion (48b), and extends throughout the axial direction of the outer peripheral wall portion (48b).

The insulating member (60) having the above structure is formed through molding of resin material that is to serve as the insulating member (60), integrally with the core body (40) by so-called insert molding. In the present embodiment, as described above, each of the contact portions (61) provided at the inner peripheral wall portion (48a) and an associated one of the contact portions (66) provided at the outer peripheral wall portion (48b) are connected to each other at one end side in the cylinder axial direction of the stator core (70). Therefore, the contact portions (61, 66) may be easily integrated with each other by injecting the resin material from the one end side in the cylinder axial direction. No weld is produced at the other end side in the cylinder axial direction in the insert molding. This is advantageous because a weld cracking, i.e., a phenomenon in which if there is a weld, cracks may occur at a portion where the weld is present, does not occur.

Advantages of Fourth Embodiment

In the present embodiment, the contact portions (61) provided at the inner peripheral wall portion (48*a*) and the contact portions (66) provided at the outer peripheral wall portion (48*b*) may be easily integrated together.

Fifth Embodiment

The fifth embodiment will be described. A stator core (70) of the present embodiment is a modified version, of the stator core (70) of the fourth embodiment, in which the configuration of the insulating member (60) has been changed. Here, the stator core (70) of the present embodiment will be described, including differences from the stator core (70) of the fourth embodiment.

Figure 12:
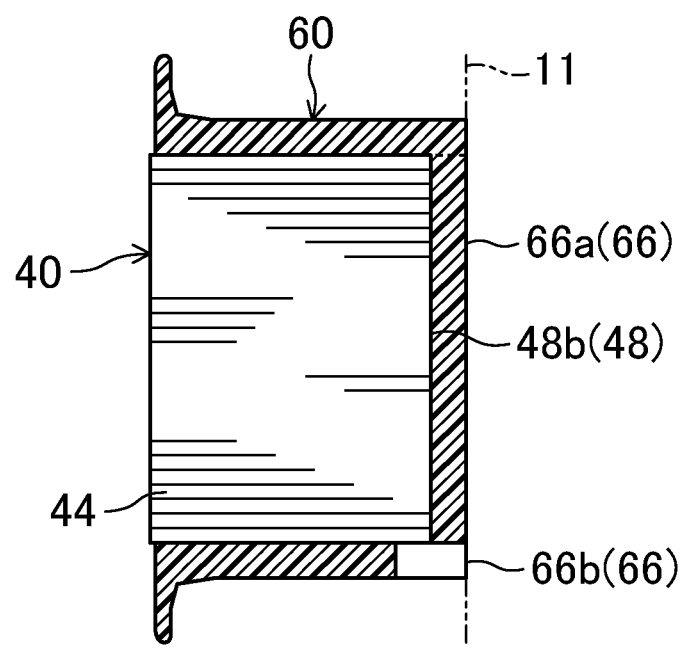
FIG. 12 is a vertical cross-sectional view of a part of a stator core of a fifth embodiment.

As shown in FIG. 12, the insulating member (60) of the present embodiment is configured such that portions of the insulating member (60) at the outer peripheral wall portion (48*b*) sandwich the back yoke (41) from both ends in the axial direction.

Specifically, the contact portion (66) of the insulating member (60) provided at the outer peripheral wall portion (48*b*) is divided into a first portion (66*a*) and a second portion (66*b*). In FIG. 12, the first portion (66*a*) is closer to the viewer of the drawing, and the second portion (66*b*) is farther from the viewer of the drawing. The first portion (66*a*) and the second portion (66*b*) are adjacent to each other in the circumferential direction of the stator core (70).

The first portion (66*a*) is continuous with the contact portion (61) provided at the inner peripheral wall portion (48*a*) at one end side (in this example, the upper end side) in the cylinder axial direction of the stator core (70). On the other hand, the first portion (66*a*) is not continuous with the contact portion (61) provided at the inner peripheral wall portion (48*a*) at the other end side (in this example, the lower end side) in the cylinder axial direction of the stator core (70).

The second portion (66*b*) is continuous with the contact portion (61) provided at the inner peripheral wall portion (48*a*) at the other end side in the cylinder axial direction of the stator core (70). On the other hand, the second portion (66*b*) is not continuous with the contact portion (61) provided at the inner peripheral wall portion (48*a*) at the one end side in the cylinder axial direction of the stator core (70).

The insulating member (60) having the above structure is formed through molding of resin material that is to serve as the insulating member (60), integrally with the core body (40) by so-called insert molding. As describes above, in the present embodiment, the contact portion (61) provided at the inner peripheral wall portion (48*a*) and the contact portion (66) provided at the outer peripheral wall portion (48*b*) are continuous with each other at one end side and the other end side in the cylinder axial direction of the stator core (70). However, a portion where the contact portions (61, 66) are continuous with each other on the one end side in the cylinder axial direction (in other words, a portion corresponding to the first portion (66*a*)), and a portion where the contact portions (61, 66) are continuous with each other on the other end side in the cylinder axial direction (in other words, a portion corresponding to the second portion (66*b*)) are at different positions in the circumferential direction of the stator core (70). Thus, no weld is produced in an insert molding, and weld cracking may be advantageously prevented.

Sixth Embodiment

The sixth embodiment will be described. A stator core (70) of the present embodiment is a modified version of the stator core (70) of the fourth embodiment, in which positions of the contact portions (66) at the outer peripheral wall portion (48*b*) have been changed. Here, the stator core (70) of the present embodiment will be described, including differences from the stator core (70) of the fourth embodiment.

Figure 13:
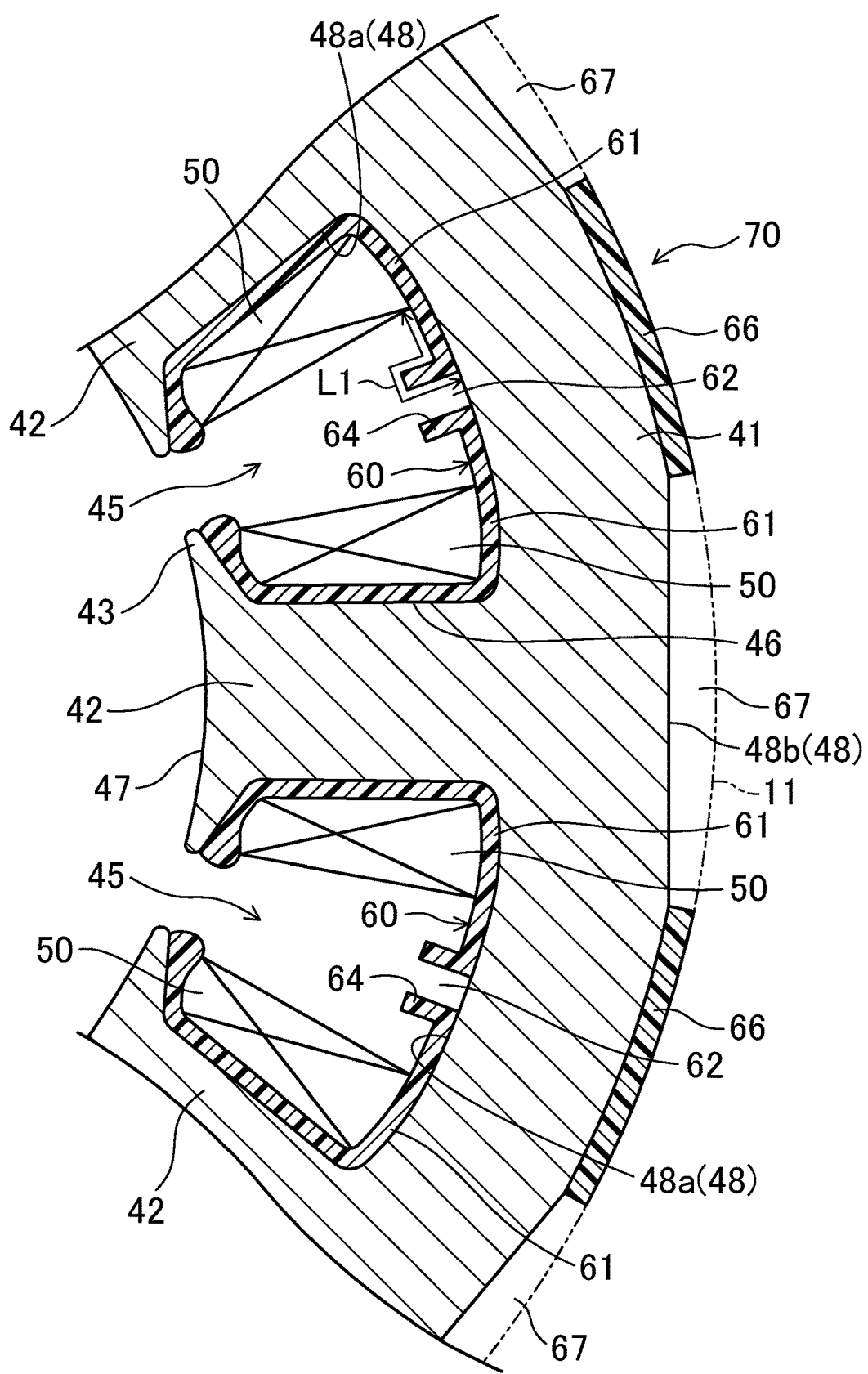
FIG. 13 is an enlarged view of a vicinity of a tooth in a horizontal cross section of a stator core of a sixth embodiment.

As shown in FIG. 13, the contact portions (66) provided at the outer peripheral wall portion (48*b*) are disposed on an outer peripheral side of each clearance (62) at the inner peripheral wall portion (48*a*). Therefore, respective clearances (67) at the outer peripheral wall portion (48*b*) are disposed on the outer peripheral side of the teeth (42). Note that a circumferential length of the contact portion (66) shown in FIG. 13 is merely an example, and may be longer or shorter than the length shown.

Seventh Embodiment

The seventh embodiment will be described. A stator core (70) of the present embodiment is a modified version of the stator core (70) of the fourth embodiment, in which positions of the contact portions (66) at the outer peripheral wall portion (48*b*) have been changed. Here, the stator core (70) of the present embodiment will be described, including differences from the stator core (70) of the fourth embodiment.

Figure 14:
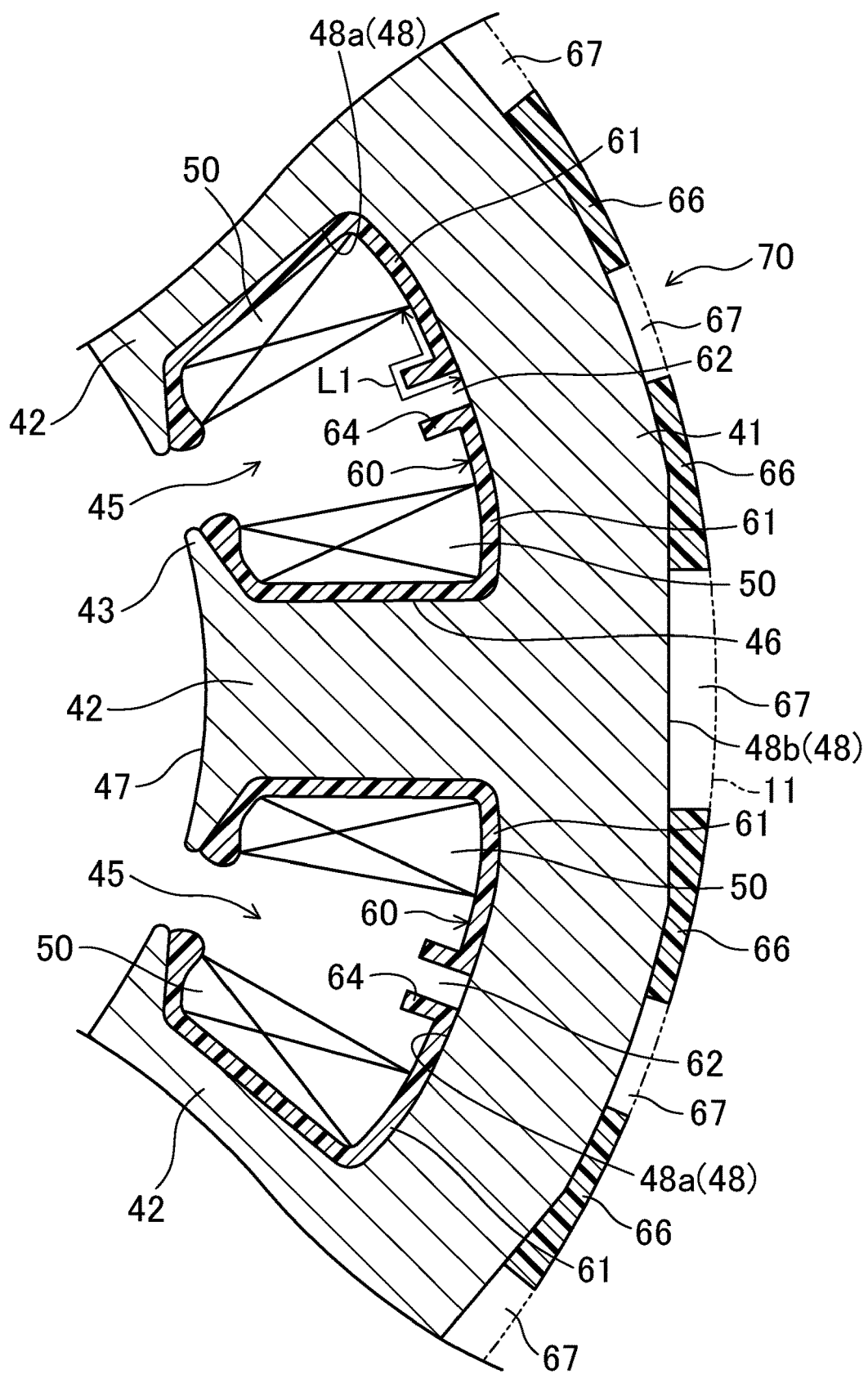
FIG. 14 is an enlarged view of a vicinity of a tooth in a horizontal cross section of a stator core of a seventh embodiment.
Figure 15:
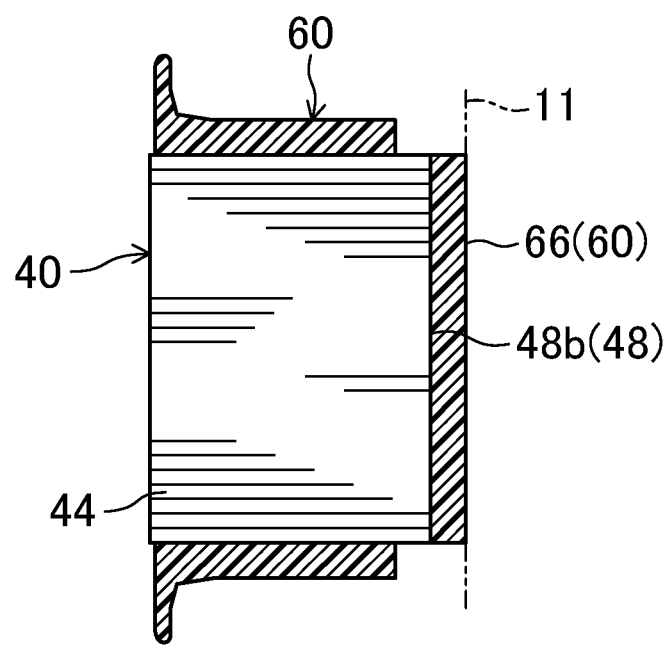
FIG. 15 is a vertical cross-sectional view of a part of a stator core of an eighth embodiment.

As shown in FIG. 14, the contact portions (66) provided at the outer peripheral wall portion (48*b*) are disposed on the outer peripheral side of each contact portion (61) provided at the inner peripheral wall portion (48*a*). Therefore, clearances (67) are disposed at the outer peripheral wall portion (48*b*) on the outer peripheral side of the tooth (42) and on the outer peripheral side of the clearance (62) at the inner peripheral wall portion (48*a*). Note that a circumferential length of the contact portion (66) shown in FIG. 14 is merely an example, and may be longer or shorter than the length shown.

Eighth Embodiment

The eighth embodiment will be described. A stator core (70) of the present embodiment is a modified version of the stator core (70) of the fourth embodiment, in which the configuration of the contact portions (66) at the outer peripheral wall portion (48*b*) has been changed. Here, the stator core (70) of the present embodiment will be described, including differences from the stator core (70) of the fourth embodiment.

The contact portions (66) provided at the outer peripheral wall portion (48*b*) are not continuous with the contact portions (61) provided at the inner peripheral wall portion (48*a*) on one end side (in this example, the upper end side) and the other end side in the cylinder axial direction of the stator core (70). Thus, no weld is produced in an insert molding, and weld cracking may be advantageously prevented.

OTHER EMBODIMENTS

The above-described embodiments may be modified in the following manner.

In each of the above-described embodiments, the noncontact portion (62, 65) is provided at the inner peripheral wall portion (48a), particularly on the inner peripheral surface of the back yoke (41). However, the noncontact portion (62, 65) may be provided on an outer surface of the tooth (42).

In each of the above embodiments, the slot (45) of the stator core (70) is open on the inner peripheral side. However, the slot (45) of the stator core (70) may be closed on the inner peripheral side.

In each of the above-described embodiments, one noncontact portion (62, 65) is formed in each slot (45). However, a plurality of noncontact portions (62, 65) may be provided in each slot (45). Moreover, the noncontact portion (62, 65) may not be provided in all of the plurality of slots (45). For example, the noncontact portions (62,65) may be provided in three slots (45) out of nine slots (45). In other words, at least one noncontact portion (62,65) may be provided for the stator core (70).

In each of the above-described embodiments, the insulating member (60) is formed only on the inner peripheral wall portion (48a) or on the inner peripheral wall portion (48a) and the outer peripheral wall portion (48b). However, the insulating member (60) may be formed, for example, only on the outer peripheral wall portion (48b).

In each of the above-described embodiments, a so-called inner rotor-type electric motor (15) has been illustrated in which the rotor (20) is provided on the inner peripheral side of the stator (30). However, a so-called outer rotor-type electric motor in which the rotor is provided on the outer peripheral side of the stator may be employed, as well.

In each of the above-described embodiments, the insulating member (60) has been illustrated in which the noncontact portion (62, 65, 67) is provided in advance. However, the stator core (70) may be configured such that the noncontact portion (62, 65, 67) is formed after the electric motor (15) is manufactured. For example, a part of the insulating member (60) may be a planned breaking part having a strength lower than that of the other portion of the insulating member (60), and the clearance (62) may be formed by breaking the planned breaking part during operation of the electric motor (15).

While the embodiments and modifications have been described above, it will be understood that various changes in form and details can be made without departing from the spirit and scope of the claims. The above embodiments and modifications may be appropriately combined or replaced as long as the functions of the target of the present disclosure are not impaired.

As can be seen from the foregoing description, the present disclosure is useful for a stator core and a compressor.

The invention claimed is:

1. A stator core of an electric motor, the stator core comprising:
   a core body having
      a back yoke with a cylindrical shape, and
      a plurality of teeth extending from the back yoke radially inward of the stator core;
   a plurality of slots, each of the slots being located between adjacent ones of the teeth; and
   an insulating member integrated with the core body, the insulating member having a linear expansion coefficient different from a linear expansion coefficient of the core body,
   the insulating member including a plurality of contact portions extending throughout a cylinder axial direction of the stator core and being in contact with a peripheral wall portion of the core body,
      an inner clearance being provided between adjacent ones of the contact portions within each of the slots, the inner clearance extending an entire length of the peripheral wall portion in the cylinder axial direction,
      each of the contact portions including a projected portion protruding radially inward toward an inner side of the slot in a radial direction perpendicular to the cylinder axial direction such that the insulating member includes a plurality of projected portions,
      the projected portions not being in contact with the peripheral wall, and
      the inner clearance existing between adjacent ones of the projected portions within each of the slots,
   the peripheral wall portion having
      an inner peripheral wall portion forming a peripheral wall of each of the slots, and
      an outer peripheral wall portion forming an outer peripheral wall of the core body,
   the insulating member being located at at least the inner peripheral wall portion, and
   the insulating member being divided by the inner clearance at the peripheral wall portion.

2. The stator core according to claim 1, wherein
   the insulating member is located at the inner peripheral wall portion and the outer peripheral wall portion, and
   in the insulating member, each of the contact portions provided at the inner peripheral wall portion and an associated one of the contact portions provided at the outer peripheral wall portion are continuous with each other at one end side in the cylinder axial direction of the stator core.

3. The stator core according to claim 2, wherein
   an outer clearance is provided between adjacent ones of the contact portions at the outer peripheral wall.

4. A compressor including an electric motor having a stator core,
   the stator core comprising:
   a core body having
      a back yoke with a cylindrical shape, and
      a plurality of teeth extending from the back yoke radially inward of the stator core;
   a plurality of slots, each of the slots being located between adjacent ones of the teeth; and
   an insulating member integrated with the core body, the insulating member having a linear expansion coefficient different from a linear expansion coefficient of the core body, the insulating member including a plurality of contact portions extending throughout a cylinder axial direction of the stator core and being in contact with a peripheral wall portion of the core body,
      an inner clearance being provided between adjacent ones of the contact portions within each of the slots, the inner clearance extending an entire length of the peripheral wall portion in the cylinder axial direction,
      each of the contact portions including a projected portion protruding radially inward toward an inner side of the slot in a radial direction perpendicular to the cylinder axial direction such that the insulating member includes a plurality of projected portions,
the projected portions not being in contact with the peripheral wall, and
the inner clearance existing between adjacent ones of the projected portions within each of the slots,
the peripheral wall portion having
an inner peripheral wall portion forming a peripheral wall of the slot, and
an outer peripheral wall portion forming an outer peripheral wall of the core body,
the insulating member being located at at least the inner peripheral wall portion, and
the insulating member is divided by the inner clearance at the peripheral wall portion.

5. The compressor according to claim 4, further comprising
a drive shaft driven to rotate by the electric motor; and
a compression mechanism coupled to the drive shaft and configured to operate and compress a fluid when the drive shaft is driven to rotate.

\* \* \* \* \*